United States Patent [19]

Tan et al.

[11] Patent Number: 5,135,624
[45] Date of Patent: Aug. 4, 1992

[54] ELECTROLYTIC HYDROMETALLURGICAL SILVER REFINING

[75] Inventors: Khay Gie J. Tan; Orlando Dinardo, both of Nepean, Canada

[73] Assignee: Her Majesty the Queen in right of Canada, as represented by the Minister of Energy, Mines and Resources, Canada

[21] Appl. No.: 644,541

[22] Filed: Jan. 23, 1991

[30] Foreign Application Priority Data

May 17, 1990 [CA] Canada ................................ 2017032

[51] Int. Cl.$^5$ ................................ C25C 1/20
[52] U.S. Cl. ................................ 204/109; 204/105 R
[58] Field of Search ........................... 204/105 R, 109

[56] References Cited

U.S. PATENT DOCUMENTS

| | | | |
|---|---|---|---|
| 2,322,786 | 6/1943 | Betterton et al. | 204/109 |
| 3,616,332 | 10/1971 | Miller et al. | 204/109 |
| 4,090,935 | 5/1978 | Dunning, Jr. et al. | 204/109 |
| 4,229,270 | 10/1980 | Subramanian et al. | 204/109 |
| 4,537,628 | 8/1985 | Lakshmanan et al. | 75/118 |
| 4,670,115 | 6/1987 | Prior et al. | 204/109 |

FOREIGN PATENT DOCUMENTS 93937 6/1905 Canada .
1059771 8/1979 Canada .

Primary Examiner—T. Tung
Assistant Examiner—David G. Ryser
Attorney, Agent, or Firm—Nixon & Vanderhye

[57] ABSTRACT

An efficient hydrometallurgical refining method is disclosed for the production of high purity silver. The method comprises: casting an anode of raw silver; subjecting the cast anode to an electrorefining stage wherein the raw silver is directly electrorefined in a suitable electrolyte solution; leaching the anodic residue with an appropriate lixiviant to dissolve impurities and precipitate silver in the form of a silver compound that is suitable for conditioning the electrolyte; treating the leach liquor to recover dissolved silver and recycling recovered silver to the leaching or anode casting stage; and treating the anolyte in a conditioning stage with an appropriate silver compound prior to recycle to the electrorefining stage as catholyte. The process is fast and simple to operate since the sequencing of steps has been rationalized and the reagent requirements and harmful emissions are low. The life of the electrolyte extends over many electrode cycles and valuable byproducts are also recovered. In the preferred embodiment, raw silver anodes with major arsenic and antimony impurities are electrorefined directly; e.g., in a silver nitrate medium using a diaphragm cell. The major impurities form a porous, thick and adherent layer which is spalled off periodically. Pure silver is deposited at the cathode as a dense powder at a high current efficiency. The anolyte is pumped to an external conditioning circuit where $Ag_2SO_4$ and lime are added to maintain a stable electrolyte composition. The treated electrolyte is then recycled to the cathode compartment. Silver sulphate ($Ag_2SO_4$) is produced by leaching the anodic residues and/or other suitable materials in a separate step.

17 Claims, 3 Drawing Sheets

ELECTROLYTIC HYDROMETALLURGICAL SILVER REFINING

BACKGROUND OF THE INVENTION

This invention relates to an integrated refining method for the hydrometallurgical production of high purity silver. More particularly, the invention relates to a method for the recovery of silver from raw silver anodes, which contain major impurities, by direct electrorefining thereof and with circulation of the electrolyte through an external conditioning circuit. Concentrated leaching of the anodic residue and/or other suitable materials containing silver with an appropriate lixiviant followed by dilution of the leachate dissolves impurities and precipitates silver as a silver compound useful for the conditioning of recirculating electrolyte. Appropriate alkaline earth compounds are used to convert the silver compound into a more convenient form and control reagent concentrations throughout the process.

DESCRIPTION OF THE RELATED ART

Widely available silver and arsenic bearing concentrates can be smelted to produce a discardable slag, a base metal speiss phase and a crude silver button which is easily separated from the others after solidification. The silver recovery depends on the smelting strategy and becomes unacceptably small if the silver content of the button exceeds 90%.

One known method for subsequent refining consists of remelting the button and then slowly pouring the melt into water following a circular pattern. The gnarled granules of so-called "popcorn silver" that are produced provide sufficient surface area for leaching in nitric acid. The latter reagent is relatively expensive, non-selective, volatile and unstable, releasing toxic and corrosive nitrous oxide fumes. The dissolution of the popcorn silver is often incomplete despite intensive leaching with excess acid and extended periods above 80° C.

Impure metallic silver is obtained from the degassed, clarified and neutralized leach solution by cementation on copper powder. The cement silver is filtered, washed and dried before melting and casting into anodes for conventional electrorefining. Large amounts of silver-free solution must be treated to eliminate arsenic, antimony, copper and other base metals prior to discharge to the environment. The carcinogenic nitrate ion, however, is not readily removed and may produce undesirable growth of algae in the receiving bodies of water. Therefore, the distinct disadvantages of this known method are caused by the problematic and inefficient processing steps that are characterized by alternating melting and leaching/precipitation procedures, large reagent expenditures and major environmental hazards. Additional limitations are closely associated with the design of upstream and downstream operations, the availability of other feed materials, various plant-internal and -external recycle options, and the recovery and marketability of potential byproducts.

Commonly, the electrorefining of silver with silver nitrate electrolyte is carried out with anodes containing greater than 99% of noble metals (mainly silver with some gold and platinum group metals). Thus, the electrodeposition of pure silver is preceded invariably by many smelting and leaching steps, similar in complexity to the known process described above. For example, Canadian Patent No. 1,059,771 (Heimala et al) describes a hydrometallurgical process for the recovery of valuable components (precious metals, base metals, selenium and tellurium) from copper-refinery anode slimes in which the raw material is heated with concentrated sulphuric acid to dissolve Ag, Se, Te and Ba and wherein the filtered solution is treated by electrolysis to separate Ag, Se and Te therefrom. The purified sulphuric acid is then returned to react with more raw material, whereas the cathode deposit is smelted or roasted to upgrade the silver prior to conventional electrorefining. As well, U.S. Pat. No. 4,229,270 (Subramanian et al) teaches a hydrometallurgical process for the recovery of silver from anode slimes which also contain selenium and/or tellurium and optionally copper, nickel and other precious metal values. The raw material is subjected to a series of caustic and acid leaches in various optional sequences, then the final upgrade residue is treated with dilute nitric acid to dissolve silver values as silver nitrate, then the solution is contacted with silver oxide to selectively remove remaining impurities, and finally the silver is electrowon from the silver nitrate-containing solution.

Furthermore, U.S. Pat. No. 4,537,628 (Lakshmanan et al) described a method for the recovery of precious metals such as gold and silver from ores, concentrates, tailings and wastes that also contain sulphide, arsenic and/or antimony, by treatment with Caro's acid ($H_2SO_5$) which oxidizes at least part of the arsenic and-/or antimony content, thereby exposing the precious metals for subsequent leaching with the aqueous solutions of cyanide or thio compounds. The precious metals are recovered from the solutions in an impure form by electroplating and must be further upgraded prior to conventional electrorefining.

The high grade of silver anodes is required to minimize the build up of impurities in the electrolyte which is generally fouled after a few electrode cycles. A known method is to discard the solution after cementation of the silver on copper powder and to prepare fresh electrolyte by dissolving some of the refined silver in nitric acid. Consequently, the silver recycle is increased in a manner that adds considerably to the inventory hold-up time, the reagent consumption and the waste treatment load. Paradoxically, several common methods of electrorefining silver have encouraged the dissolution of impurities such as cadmium, copper, nickel and bismuth. For example, Canadian Patent No. 93,937 (Betts) describes a process of electrolytically refining silver wherein a bishmuth-containing silver alloy is the anode and the electrolyte contains a free, non-oxidizing, monobasic, strong acid, the silver salt of said acid, and an agent to hinder growth towards the anode. After precipitating the silver, dissolved bismuth is recovered from the fouled electrolyte by cementation on metallic lead, and then silver sulphate is added and precipitated lead sulphate is removed so that the regenerated electrolyte can be recycled.

U.S. Pat. No. 3,616,332 (Miller et al) describes the dissolving of impurities such as Cd, Cu and Ni by electrorefining silver scrap in glutamic and sulphamic acid solutions. The increased solubility of silver also allows operation at very high current densities, and fouled electrolyte is subjected to electrostripping with insoluble anodes followed by AgCl precipitation. Byproducts and reagents are recovered, but the silver recycle burden (as AgCl and $Ag_2O$) is considerable.

An alternative method which addresses the complete electrolyte reconditioning on a periodic basis is described in U.S. Pat. No. 4,670,115 (Prior et al). The method is based on sophisticated techniques that combine liquid membrane permeation and/or solvent extraction (SX), precipitation, electrolysis and electrodialysis. More specifically, the silver concentration is augmented by electrodissolution of crude silver in a purified electrolyte (SX raffinate) and the extracted impurities are electrodeposited from the SX stripping solution in the separate compartments of a diaphragm cell. U.S. Pat. No. 2,322,786 (Betterton et al) describes a more simplistic method in which the silver in the electrolyte is replenished with silver nitrate ($AgNO_3$) and the dissolution of some impurities such as Pd is avoided by controlling the acidity of the electrolyte between pH 3 and 4 by operating at a sufficiently high current density. The $AgNO_3$ is an expensive reagent and other impurities such as copper are allowed to build up in the electrolyte.

SUMMARY OF THE INVENTION

An object of the present invention, therefore, is to provide a hydrometallurgical silver refining method which minimizes processing requirements such as reagent consumption, retention time, equipment and operating costs, and which avoids the emission of environmentally hazardous wastes.

It is a further object of the invention to provide a hydrometallurgical silver refining method for the recovery of high purity silver from raw silver which contains major impurities by direct electrorefining thereof.

It is a still further object of this invention to provide a silver refining method for the recovery of high purity silver comprising the direct electrorefining of raw silver, circulation of the anolyte through an external conditioning circuit and the leaching of the anodic residue or scrap with an appropriate lixiviant to precipitate silver as an appropriate silver compound to be used to condition the electrolyte.

Accordingly, the invention provides an integrated refining method for the hydrometallurgical production of high purity silver from raw silver containing major impurities, which comprises: casting an anode of the raw silver; subjecting the cast anode to an electrorefining stage wherein the raw silver is directly electrorefined in a suitable electrolyte solution and wherein an anode bag separates the anode and cathode compartments for impurity control; leaching the anodic residue at an elevated temperature with an appropriate lixiviant to dissolve impurities and precipitate silver in the form of a silver compound that is suitable for maintaining the required silver concentration in the electrolyte; treating the leach liquor to recover dissolved silver and recycling recovered silver to the leaching or anode casting stage; treating the anolyte in a conditioning stage with an appropriate silver compound to compensate for silver depletion from the solution and an appropriate alkaline earth, calcium or alkali compound for pH- and reagent-control prior to recycle to the electrorefining stage as catholyte; and optionally treating bleeds from the conditioning stage and barren leach solution for byproduct recovery.

DETAILED DESCRIPTION OF THE INVENTION

The invention proceeds from the recognition that the electrolytic dissolution of silver is more advantageous than leaching in nitric acid provided that the build up of impurities from the electrolyte and the depletion of the dissolved silver level can be prevented in order to prolong electrolyte life. It is also recognized that redundant melting, granulation, precipitation and dissolution steps are substantially eliminated and/or reduced in size by considering the inherent characteristics of available feed materials, intermediate products and processing options. Modular flexibility allows the tailoring and balancing of individual circuits and optimising of the integrated process in terms of operational stability, production efficiency and environmental safety.

It has been found that the direct electrorefining of remelted popcorn silver, containing between 70 to 92% Ag, 0 to 100 ppm Au and 1 to 6% each of As, Sb, Cu, Co, Ni, Fe and Pb, resulted in less than 1 g/L As and less than 0.5 g/L of all other impurities reporting to the electrolyte over a period of several days. Pure silver (99.9% grade) was produced under varying electrorefining conditions with $AgNO_3$ electrolyte and vertical or horizontal electrodes. A dense scale formed at the anode with sufficient porosity so as not to inhibit the electrorefining process and a coarsely woven cloth provided therein caught any anodic debris that spalled off occasionally after mechanical disturbances. The appearance of this dark grey debris was a layered and slightly more voluminous replica of the original shape of the anode. The composition was typically from 40 to 50% Ag and 10 to 30% As and Sb, and the presence of an oxidate phase has qualitatively been confirmed by FTIR spectroscopy.

In a preferred embodiment, the raw silver used in the method of the invention is popcorn silver. The method is also equally effective for the refining of other types of silver-containing materials such as base metal refinery anode slimes, high grade concentrates or leach residues, bullion, jewelry or dental scrap, photographic or electronic wastes, and mint sweeps or coinage recycle. Mixtures of various materials may also be employed, but their suitability should be determined on an individual basis. Less suitable raw materials may be treated by simple and inexpensive hydro- and pyro-metallurgical steps before entering the process.

Leaching of the anode scrap in concentrated sulphuric acid at a solids pulp density between 500 and 10,000 g/L for 15 to 120 minutes and at elevated temperatures, such as from 50° to 300° C., reliably converts all of the silver to $Ag_2SO_4$ which has a limited solubility in aqueous media and as a result precipitates upon dilution of the cooled leachate with 25 to 100% (v/v) of water. Substantially all of the impurities including As, Sb and the majority of base metals dissolve and are thus separated from the precipitated $Ag_2SO_4$ product which can then be purified by reprecipitation from $NH_4OH$ and/or converted into other forms if so desired (e.g. $Ag_2O$, $Ag_2CO_3$, $AgNO_3$ or Ag metal). The leaching of the anode scrap may also be by a suitable alkaline medium allowing the recovery of anionic impurities as byproducts. Any silver remaining in solution (less than 10 g/L) can be recovered by suitable means such as selective adsorption, extraction, reduction or precipitation. The small leach volumes and the absence of nitrates greatly simplify the treatment of the silver-free solution for by-product recovery prior to discharge. An advantage of the present invention is the flexibility and compatibility with many established methods for the control and recovery of impurities. The treatment strategy of the present invention rationalizes the sequencing of selected steps to exploit their inherent advantages. For example, leaching has been reduced to converting finely divided, low grade materials into a high grade silver compound which is suitable for use in the main electrorefining step. Tailoring and balancing of the individual circuits is achieved by considering the characteristics of the intermediate products and avoiding operational and environmental problems. Efficient upgrading is achieved in the few remaining steps, even in the melting and casting of the cathode silver where residual traces of impurities will report to the flux. Reagent requirements are adjusted to the composition of the feed material and the electrolyte conditioning circuit can consist of modules that respond to those impurities or solution qualities that are of primary concern.

The complexity of the metallurgical feed materials that may enter the process depends upon the presence of many problematic impurity components and on the difficulty of separating intimate mixtures of minerals by physical means.

It is well known to those skilled in the art that the complete dissolution of silver is relatively slow and problematic, and that a highly corrosive medium such as nitric acid must be used. Hitherto, it has only been possible to obtain high quality electrorefined products from highly prepurified anodes. However, the present invention achieves the direct electrorefining of impure silver anodes to obtain high purity silver product.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
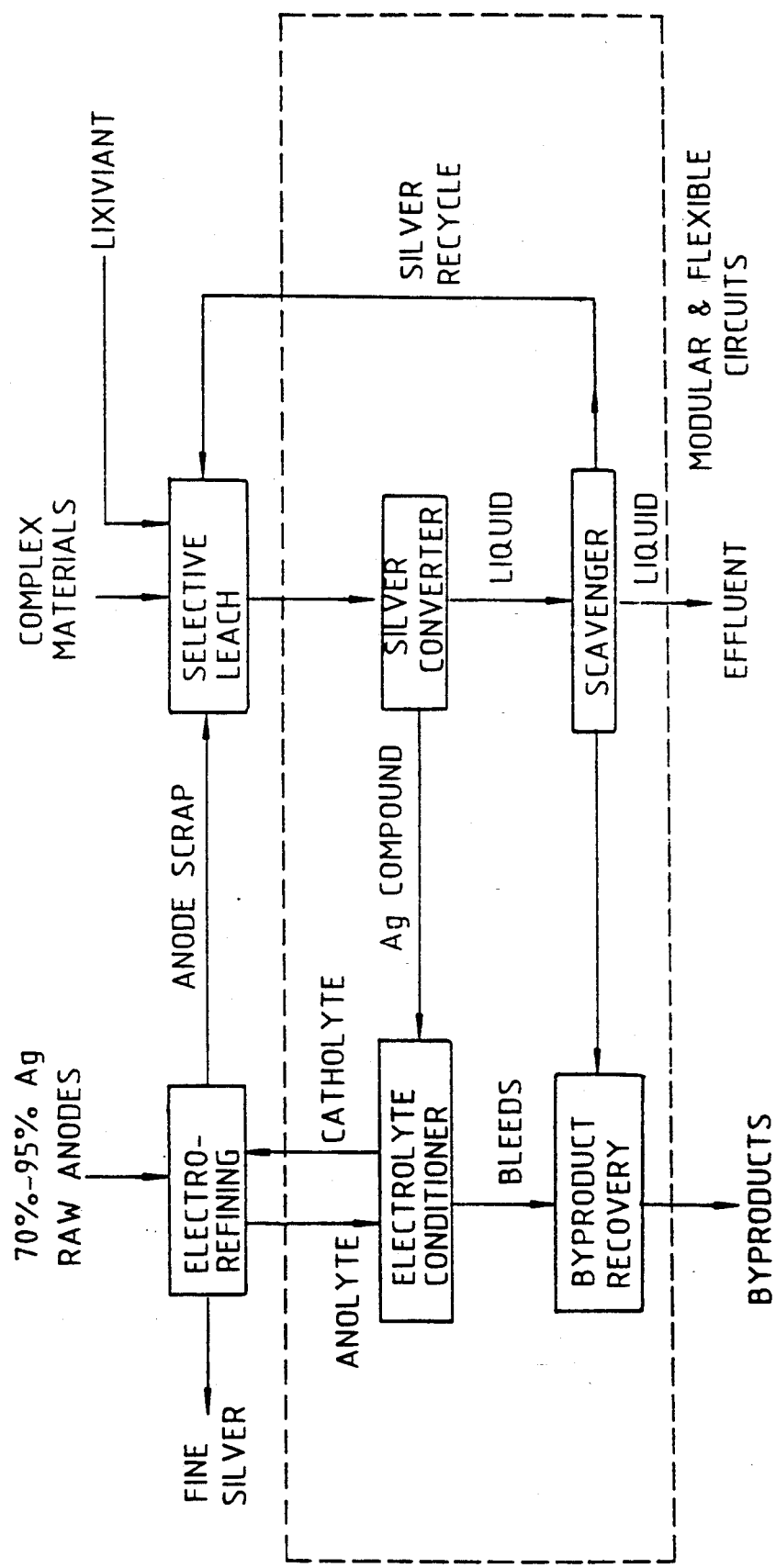
FIG. 1 is a general flowsheet of the hydrometallurgical silver refining process as embodied by the invention.

In general, the process of the invention can be represented by FIG. 1. Accordingly, the process comprises casting an anode of raw impure 70 to 95% silver; subjecting the cast anode to an electrorefining stage wherein the raw silver is directly electrorefined in a suitable electrolyte solution to obtain fine silver; selectively leaching the anodic residue, scrap and/or suitable low grade complex materials at an elevated temperature with an appropriate lixiviant, preferably concentrated sulphuric acid, to dissolve impurities, and in a silver converter precipitate silver in the form of a silver compound that is suitable for recycle; withdrawing and treating electrolyte in a conditioning stage with appropriate reagents to control the solution composition prior to recycle to the electrorefining stage; in a scavenger station separating recyclable silver from treated leach solution and expelling waste effluents; and, preferably, processing the barren leach liquor and bleeds from the conditioning unit to recover byproducts and to achieve environmentally acceptable standards prior to discharge to the environment. The electrorefining and selective leach stages are central to the process of invention, however, the remaining stages shown in FIG. 1 are modular and flexible circuits that can be arranged in accordance with a specific recovery scenario.

Low grade and complex powders include very low-grade silver materials not suitable for the electrorefining step in that they are not easily cast or compressed into electrically conductive anodes, result in excessive slime or residues, exhibit poor current efficiency and have a short electrolyte life. However, when in finely divided form, such as powder form, such materials exhibit high surface area and are directly suitable for chemical leaching. Complex materials, on the other hand, tend to have fewer restrictions in terms of the grade and form of the feed, e.g. whole coins may be used as the feed instead of powders.

Depending upon the composition of the feed and the processing strategy, it may also be possible to employ an organic medium and/or a liquified gas, for example acetonitrile, dimethylsulphoxide (DMSO), liquid $SO_2$ or supercritical $CO_2$, to perform the functions of either or both the lixiviant and the electrolyte.

The purpose of the scavenger stage shown in FIG. 1 is to ensure the complete recovery of precious metals. Small amounts of precious metal that may remain dissolved after the leaching/precipitation step are "scavenged" by means of more powerful precipitation reagents. The scavenger stage implies a general circuit that recovers not only dissolved silver and precious metals, but also valuable by-products such as copper arsenates that may be sold to the lumber industry, for example.

Figure 2:
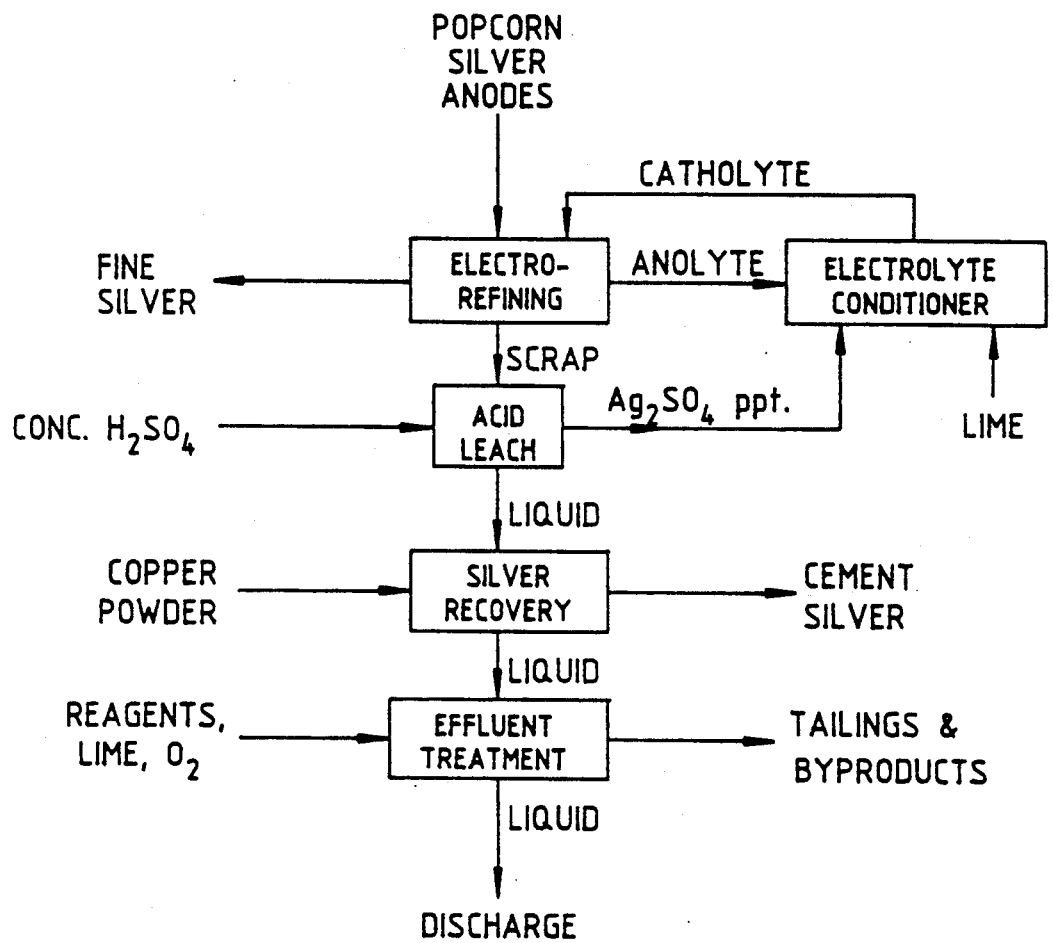
FIG. 2 shows the process flowsheet of the hydrometallurgical silver refining process used during developmental testwork as embodied by the invention.

With reference to FIG. 2, the process flowsheet used for early developmental testwork is shown and represents a preferred embodiment. In this embodiment the raw silver used is popcorn silver.

As stated above, the method is also equally effective for the refining of other types of silver-containing materials such as base metal refinery anode slimes, high grade concentrates or leach residues, bullion, jewelry or dental scrap, photographic or electronic wastes, and metal sweeps or coinage recycle. Mixtures of various materials may also be employed, but their suitability should be determined on an individual basis. Less suitable raw materials may be treated by simple and inexpensive hydro- and pyro-metallurgical steps before entering the process.

The raw material need not be remelted and cast into popcorn or rectangular anodes as long as adequate room is provided by the anode compartment and good electrical contact can be maintained; conventional Moebius or Thum cells may be used. The preferred electrolyte of use is silver nitrate, of pH range 1 to 4, which contains dissolved silver of between 5 and 100 g/L and at temperatures between 10° and 80° C. and which may be saturated with sparingly soluble compounds such as Ag, As, Ca, Sb and sulphates between 0.001 and 30 g/L. Also, the $AgNO_3$ electrolyte may contain traces or controlled quantities of many other chemical compounds comprised of elements from the entire Periodic Table. Other electrolytes may be considered if the impurity levels in solution can be controlled and passivation of the anode can be prevented. The current density is most efficient between 100 and 3000 $A/m^2$ and cell voltages between 0.2 and 9 volts. Any chemically resistant membrane may separate the anode and cathode compartments, and a mechanical scraping and cathode-silver collection device may be used to prevent silver dendrites from growing through the membrane. During the electrorefining stage the pH of the electrolyte often decreases very slowly and the evolution of small amounts of nitrous oxide gas occurs; especially at high current densities and at temperatures above 20° C. Generally, corrosion of the anode is quite uniform and symmetrical, indicating that only a slight diffusional resistance through the scrap layer may exist.

The anolyte is withdrawn by suction through an external circuit of modular design which consists of a lime addition station and a $Ag_2SO_4$ saturator cell. The external circuit is provided for the continuous conditioning of the electrolyte in order to maintain the required composition for efficient electrorefining of the silver; however, operation in a discontinuous periodical mode is also possible. In general, $Ag_2SO_4$ and any suitable Ca-, alkaline earth-metal or alkali-metal compound are the main conditioning reagents. The addition rates of the conditioning reagents are adjusted such that a stable electrolyte composition is obtained over extended periods of continuous operation. For those skilled in the art, it may be readily recognized that the external circuit can be tailored to any required impurity control strategy. Thus, the pH can be controlled by the addition of $HNO_3$, lime or $Ag_2O$, and the selective removal of specific base metal impurities can also be attempted. The conditioned electrolyte from the external circuit is pumped into the cathode compartment; optionally the direction of circulation may be altered arbitrarily and the anode bag may be utilized to retain any entrained or post-precipitated solids.

The immersed anode is electrorefined until the metallic silver has depleted to the extent that the electrical current decreases or the cell voltage increases drastically. At this point residual anode scrap may be withdrawn and/or a fresh anode added. The anodic residue, optionally mixed with other suitable materials, is reacted with concentrated sulphuric acid ($H_2SO_4$) at an elevated temperature until substantially all the silver has reacted. The leachate may solidify upon cooling, but the careful addition into an equivalent volume of water will dissolve most of the impurities and precipitate $Ag_2SO_4$ which is separated from the solution and recycled to optional points within the process, according to any selected circuit-control and -balancing strategy. In the preferred embodiment, the dissolved silver, which is less than 10 g/L after filtration of the cooled leach solution, is cemented out on copper powder and is then recycled to the leaching or anode smelting stage. The dissolved silver, however, may be recovered by other suitable means such as selective adsorption, extraction, reduction or precipitation. The small leach volume and the absence of nitrates simplify the treatment of the silver-free solution for by-product recovery prior to discharge to the environment. Neutralization with lime produces gypsum and in the subsequent oxyhydrolysis step mixed base metal arsenates and antimonates of use to the lumber industry are obtained. The final removal of all remaining impurities is achieved by sulfide precipitation, and the effluent is safely discarded or recycled within the plant; e.g. for smelter gas-scrubbing purposes.

Figure 3:
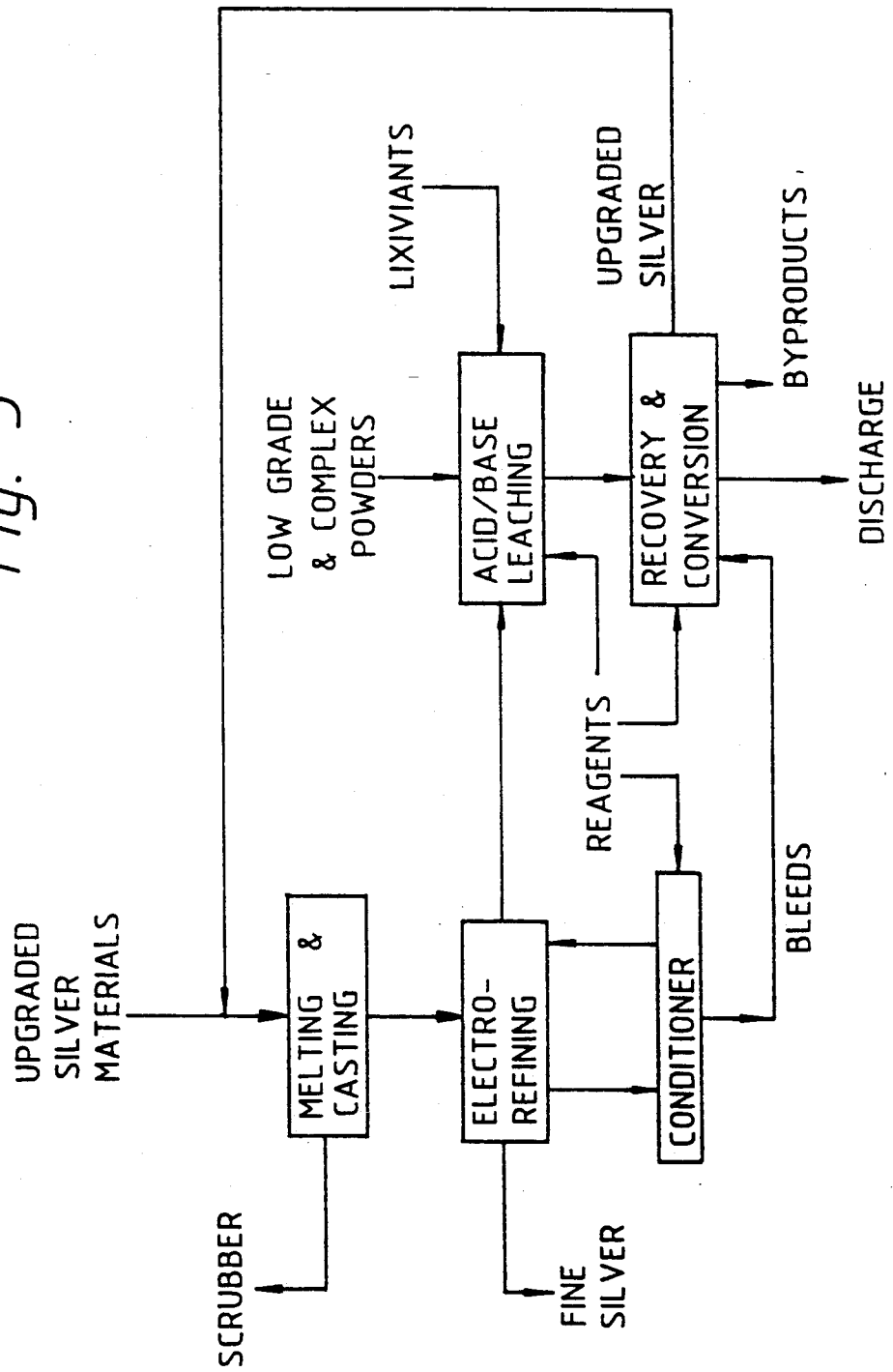
FIG. 3 shows a flowsheet of the process as embodied by the invention suitable for the treatment of unspecified potential feed materials.

Referring now to FIG. 3, a more recent embodiment of invention is shown. In this embodiment silver recovered from leach liquor is recycled to the feed.

The following examples further illustrate the invention.

EXAMPLE 1

An exploratory test revealed that the electrical contact between the individual popcorn silver beads was poor. To overcome this problem, a 6 mm diameter rod was fashioned by remelting about 30g of popcorn silver in an evacuated and sealed quartz tube for 15 minutes at 1100° C. The cooled and solidified anode rod was placed upright in a plastic anode basket with a cylinder of cloth as its vertical wall. Two 13 mm wide strips of platinum were taped to expose a total vertical cathode area of 6.5 cm$^2$. Table I summarizes the conditions and the results obtained with 250 ml of a nitrate electrolyte, at 1 to 2 V, 0.4 A, 21° C. and 5.5 to 6.5 h batch retention time.

TABLE I

| Initial (g/L) | Analyses | (% or g/L electrolyte) | | |
|---|---|---|---|---|
| | | Ag | As | Sb |
| 30 Ag$^+$ | Anode (%) | 87.4 | 4.9 | 1.9 |
| 20 Cu$^{++}$ | Cathode (%) | 99.6 | <0.06 | <0.05 |
| 0.2 H$^+$ | Scrap (%) | 59.2 | 3.7 | 9.2 |
| | Electr. (g/L) | 21.6 | 0.51 | 0.008 |
| 30 Ag$^+$ | Anode (%) | 91.7 | 3.5 | 4.7 |
| 20 Fe$^{3+}$ | Cathode (%) | 99.5 | <0.16 | 0.18 |
| 0.08 H$^+$ | Scrap (%) | 44.7 | 9.5 | 16.9 |
| | Electr. (g/L) | 28.4 | 0.21 | 0.003 |
| 30 Ag$^+$ | Anode (%) | 91.4 | 3.6 | 4.6 |
| 0.16 H$^+$ | Cathode (%) | 99.0 | 0.004 | 0.002 |
| | Scrap (%) | 47.5 | 8.8 | 19.1 |
| | Electr. (g/L) | 19.6 | 0.30 | 0.004 |

| Performance: | | | |
|---|---|---|---|
| Anode | CD | (A/m$^2$) | 407 |
| Anode | CE | (%) | 61.0 |
| Cathode | CE | (%) | 71.8 |
| Cathode | EC | (Wh/g) | 0.52 |
| Anode | CD | (A/m$^2$) | 727 |
| Anode | CE | (%) | 75.5 |
| Cathode | CE | (%) | 52.4 |
| Cathode | EC | (Wh/g) | 0.57 |
| Anode | CD | (A/m$^2$) | 920 |
| Anode | CE | (%) | 78.4 |
| Cathode | CE | (%) | 90.8 |
| Cathode | EC | (Wh/g) | 0.41 |

The purity of the silver after melting the collected cathode powder with 2% borax generally exceeded 99.4%. The anode was cleaned by mechanical removal of the adherent scrap layer which was then weighed and analyzed separately. Table I shows the relatively consistent enrichment of the impurities in the anode scrap and, to a much lesser extent, in the electrolyte. Cupric- and ferric-ions tended to redissolve deposited silver and decrease the cathodic current efficiency (CE). The energy consumption (EC) also increased in the presence of these oxidants, even when the current density was reduced.

EXAMPLE 2

A series of tests were carried out to determine the influence of various parameters by factorial design. Rotating disk anodes (1.3 cm diameter) were electrolysed in solutions of varying compositions under controlled conditions. The electrolyte volume was 150 ml, the horizontal cathode area was 9.34 cm$^2$ and the distance between the electrodes was held constant. In some of the tests silver sulphate was placed on top of the stationary diaphragm to saturate the anolyte. Test results are shown in Table II.

TABLE II

| Input Variables | | | | | | Output Response Current Efficiency (%) | |
|---|---|---|---|---|---|---|---|
| $Ag^+$ g/L | CD $A/m^2$ | Temp. °C. | Speed RPM | $H^+$ g/L | $SO_4^=$ g/L | Anode | Cathode |
| 22.5 | 780 | 35 | 100 | 0 | 0 | 77.9 | 81.8 |
| 22.5 | 1560 | 35 | 500 | 1.5 | 10 | 45.7 | 66.9 |
| 22.5 | 780 | 65 | 500 | 1.5 | 0 | 69.8 | 42.0 |
| 22.5 | 1560 | 65 | 100 | 0 | 10 | 14.7 | 72.6 |
| 45.0 | 780 | 35 | 100 | 1.5 | 10 | 68.2 | 75.2 |
| 45.0 | 1560 | 35 | 500 | 0 | 0 | 78.0 | 88.4 |
| 45.0 | 780 | 65 | 500 | 0 | 10 | 57.1 | 67.8 |
| 45.0 | 1560 | 65 | 100 | 1.5 | 0 | 81.0 | 71.9 |

Careful scrutiny of the results allowed major effects to be recognized and interpreted for design purposes. The anode was passivated by sulphate ions which had to be controlled if $Ag_2SO_4$ was to be used as the conditioning agent. Higher levels of acidity and an increase in temperature lead to the redissolution of the cathode silver. However, the current density and speed of rotation were not critical in the ranges studied.

EXAMPLE 3

The previous examples demonstrate that chemical variations are of more importance than electromechanical factors in the design. To control the sulphate level, the external conditioning circuit consisting of the $Ag_2SO_4$ saturator and a calcium addition station was devised. Starting with 250 ml of electrolyte that contained 30 g/L of Ag and proceeding under varying conditions, the results as shown in Table III were obtained:

TABLE III

| Description: | 5.5h batch | 6h batch | 33h cont. | 77h cont. |
|---|---|---|---|---|
| $Ag_2SO_4$ added: | no | yes | yes | yes |
| Temp. (°C.): | 20 | 20 | 28 | 50 |
| Current (A): | 0.42 | 0.4 | 0.4 | 0.2 |
| Cathode Ag (g): | 8.44 | 9.47 | 44.13 | 49.64 |
| Electrolyte (g/L): | | | | |
| Ag | 19.5 | 36.2 | 17.4 | 50.5 |
| As | 0.30 | 0.44 | 0.92 | 0.97 |
| Cu | n.d. | n.d. | 0.014 | 0.031 |
| Fe | n.d. | n.d. | 0.110 | 0.100 |
| Sb | 0.001 | 0.001 | 0.001 | 0.001 |
| Cath. CD ($A/m^2$): | 646 | 615 | 615 | 489 |
| Cath. CE (%): | 90.8 | 98.1 | 83.7 | 80.2 |
| Anode CE (%): | 78.4 | 76.8 | 74.8 | n.d. |
| Cath. EC (Wh/g): | 0.48 | 0.51 | 0.45 | 0.31 |

These results indicated that the process of the invention allows operation under various conditions that may be optimised for individual feed material combinations. The build up of impurities in the electrolyte can be further reduced by tight pH control with $Ag_2O$ to extend the electrolyte lifetime indefinitely. The current efficiency during continuous operation was lowered by infrequent upsets and maintenance shut downs which can be avoided by improved cell and circuit designs. Important economic viability indicators are current density, energy consumption and overall reagent requirements The results obtained with the preferred embodiment of the invention are significantly improved as compared to the current state of the art. The non-optimised results indicate that at least 99.9% pure silver can be obtained at minimum current densities of 600 $A/m_2$, and a total energy consumption of only 0.5 kWh/kg of fine silver. The process is flexible and reliable; combinations with many feed materials and downstream processes are possible; and serious environmental problems are eliminated.

We claim:

1. An integrated refining method for the hydrometallurgical production of high purity silver from raw silver containing major impurities, which comprises:
   casting an anode of the raw silver;
   subjecting the cast anode to an electrorefining stage wherein the raw silver is directly electrorefined in an electrolyte solution in a refining vessel and deposited on a cathode and wherein an anode bag separates anode and cathode compartments of the refining vessel containing an anolyte and catholyte, respectively, for impurity control;
   leaching an anodic residue resulting from the electrorefining stage at an elevated temperature with an appropriate lixiviant to dissolve impurities and give rise to a leach liquor and to precipitate silver in the form of a silver compound for maintaining the required silver concentration in the electrolyte;
   treating the leach liquor to recover dissolved silver and recycling recovered silver to the leaching or anode casting stage;
   treating the anolyte in a conditioning stage with the silver compound to compensate for silver depletion from the solution and an alkaline earth metal, or alkali metal compound for pH- and reagent-control prior to recycle to the electrorefining stage as a catholyte.

2. An integrated refining method as claimed in claim 1, wherein effluents from the leaching stage are processed prior to discharge to the environment.

3. An integrated refining method as claimed in claim 1, wherein the raw silver comprises primary and secondary silver raw material selected from members of the group comprising popcorn silver, base metal refinery anode slimes, high grade concentrates, leach residues, bullion, jewellery sweeps, dental scrap, photographic waste, electronic waste, mint sweeps and coinage recycle, and wherein part of the feed may be directed to the leaching circuit.

4. An integrated refining method as claimed in claim 1, wherein said impurities include any of arsenic, antimony, selenium, tellurium, base metals and noble metals in varying concentrations.

5. An integrated refining method as claimed in claim 1, wherein the electrolyte solution comprises aqueous silver nitrate solution containing dissolved silver in a concentration of between 5 and 100 g/L, as well as other sparingly soluble compounds selected from the ionic species of Ag, As, Ca, Sb and sulphates thereof and wherein the process proceeds in the temperature range of about 10° to 80° C.

6. An integrated refining method as claimed in claim 1, wherein the lixiviant is concentrated sulphuric acid and the leaching process is effected at a pulp density of between 500 and 10,000 g/L of the concentrated sulphuric acid and at a temperature range of about 50° to 300° C. for 15 to 120 minutes.

7. An integrated refining method as claimed in claim 1, wherein the silver compound is $Ag_2SO_4$.

8. An integrated refining method as claimed in claim 1, wherein the silver compound is $Ag_2SO_4$ which is then further treated with caustic alkali to form $Ag_2CO_3$, $AgNO_3$ or Ag metal.

9. An integrated refining method as claimed in claim 1, wherein silver dissolved during the leaching of the anodic residue is recovered by cementation with copper, other suitable reducing agents or chemical precipitants.

10. An integrated refining method as claimed in claim 1, wherein the silver compound used to condition the anolyte is $Ag_2SO_4$.

11. An integrated refining method as claimed in claim 1, wherein the electrolyte composition is controlled by reagent additions and extraction methods to prolong the electrolyte life and affect the anodic and cathodic current efficiencies as well as the form of the cathodic silver deposit.

12. An integrated refining method as claimed in claim 1, wherein the alkaline earth metal is calcium.

13. An integrated refining method as claimed in claim 12, wherein the calcium compound is $Ca(NO_3)_2$.

14. An integrated refining method as claimed in claim 12, wherein the calcium compound is lime.

15. An integrated refining method as claimed in claim 1, further comprising the steps of:
    treating bleeds from the conditioning stage and barren leach solution resulting from the leach liquor from which silver is recovered for byproduct recovery.

16. An integrated refining method as claimed in claim 15, wherein effluent control is effected by oxhydrolysis of the barren leach solution.

17. An integrated refining method as claimed in claim 15, wherein the byproducts are recovered and further refined.

* * * * *